(No Model.)

T. F. BARTLETT.
GRASS RECEPTACLE FOR LAWN MOWERS.

No. 448,188. Patented Mar. 10, 1891.

WITNESSES:
Wythe McConnell
Wm. McConnell

INVENTOR
Theron Freimont Bartlett
BY A. J. O'Brien
ATTORNEY.

UNITED STATES PATENT OFFICE.

THERON FREMONT BARTLETT, OF DENVER, COLORADO.

GRASS-RECEPTACLE FOR LAWN-MOWERS.

SPECIFICATION forming part of Letters Patent No. 448,188, dated March 10, 1891.

Application filed June 24, 1890. Serial No. 356,579. (No model.)

*To all whom it may concern:*

Be it known that I, THERON FREMONT BARTLETT, a citizen of the United States of America, residing at Denver, in the county of Arapahoe and State of Colorado, have invented certain new and useful Improvements in Grass-Receptacles for Lawn-Mowers, of which the following is a specification, reference being had therein to the accompanying drawings, and to the figures of reference marked thereon and forming a part of this specification.

My invention relates to an improved device for attachment to a lawn-mower, and its objects are to furnish a receptacle for receiving the grass from the mower as it is cut and for transmitting it to a suitable detachable receptacle, the device thus preventing the cut grass from being scattered over the lawn, and thus obviating the necessity of raking the same after it has been cut, an attachment readily applicable and so arranged as to be used on most if not all lawn-mowers now in use, the device to be of simple construction, economical in cost, reliable and durable in use, and efficient for the purpose intended.

To these ends the invention consists in the features, arrangements, and combinations hereinafter set forth and claimed.

In the accompanying drawings is illustrated an embodiment of my invention, wherein—

Figure 1:
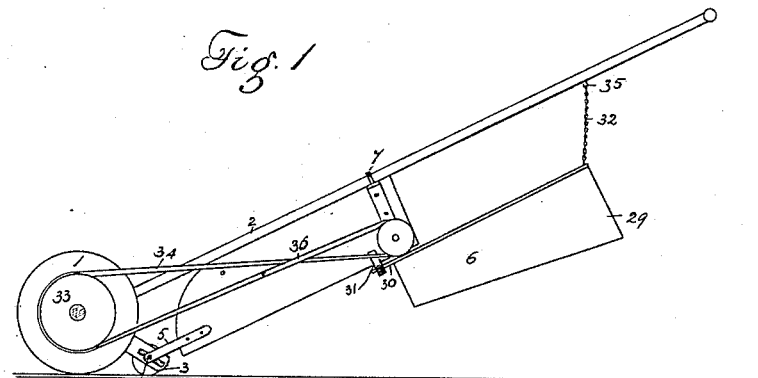
Figure 2:
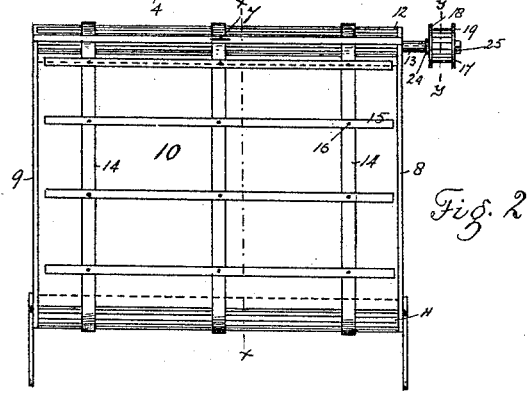
Figure 3:
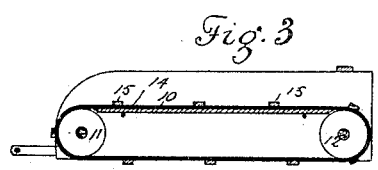
Figure 5:
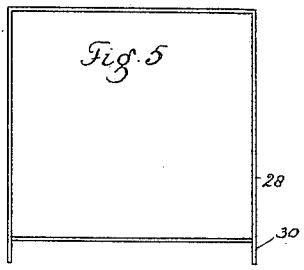
Figure 4:
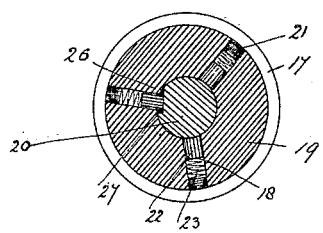

Figure 1 is a side elevation of my improved device, a lawn-mower being shown in connection therewith; Fig. 2, a top or plan view of the carrier portion of my improved device; Fig. 3, a longitudinal section of the portion shown in Fig. 2, the section being taken on the line $xx$, Fig. 2; Fig. 4, an enlarged section of the pulley shown in Fig. 2, said section being taken on line $yy$, Fig. 2; Fig. 5, a top view of the frame of the receptacle to which the canvas or other suitable material is secured.

Referring now to the views the reference-numeral 1 designates one of the main wheels of the machine to which the device is attached, 2 the handle, and 3 the roller thereof.

Secured to the machine by means of the axles 4 of roller 3, passing through suitable apertures in pieces 5, is one extremity of the carrier portion of the device, said part being adapted to catch the material as it leaves the blades of the machine and convey it to the receptacle 6, said receptacle being more particularly hereinafter described. The opposite extremity of this carrier is secured to the handle 2 of the machine by means of a suitable staple 7, through which said handle passes, said staple being secured to the rear portion of the carrier. This carrier consists of two side pieces 8 and 9 placed parallel to each other and at a suitable distance apart. These pieces are rigidly secured together in such position by means of the board 10 made of any suitable rigid material. In each extremity of the frame thus formed are suitably journaled the rollers 11 and 12, one extremity of the axle of the last-named roller being prolonged, as at 13, whereon is journaled the ratchet-wheel or pulley 19.

The reference-numeral 14 designates suitable bands or belts made of leather, rubber, or other flexible material, which are adapted to run over rollers 11 and 12. Strips 15 extend crosswise of the frame of said carrier, and are secured to bands 14 at or approximately at right angles thereto, and at suitable intervals thereon by means of rivets 16, or in any manner desired.

The ratchet-wheel or pulley 19 hereinbefore mentioned consists, primarily, of a solid wheel provided with flanges 17 located on either side thereof. Suitable apertures 18 extend from the periphery of said wheel to the central aperture through which passes spindle 13. The outer extremities of these apertures are threaded and adapted to receive screws 21. In the inner extremities of apertures 18 are located short pawls 22, adapted to move freely therein, the space intervening between screws 21 and pieces 22 being occupied by springs 23, adapted to press pieces 22 against spindle 13 when wheel 19 is in position thereon.

Rigidly secured to or made integral with spindle 13 is a suitable collar or shoulder 24, against which wheel 19 turns, while 25 is a nut screwed thereon and adapted to hold said wheel in position. A suitable notch 26, made by removing a partial segment of the circumference of the spindle 13 at the part where pulley 19 revolves, is so arranged that as said pulley is turned on said spindle in one direction, pieces 22, actuated by springs 23, slip down therein and thence slip off said segmental plain to the circumference; but in turning said pulley in the opposite direction said pieces 22 engage the shoulder 27, formed by the removal of said partial segment or chip, and turn the shaft or spindle therewith.

The grass-receptacle (designated by the numeral 6) consists of a frame 28, to which is secured in any approved manner a bag 29, made of canvas or other desired flexible material. Frame 28 is provided with arms or projections 30, being adapted to enter staples or loops 31, secured to pieces 8 and 9, while the opposite extremity of said receptacle 6 is supported by a chain, cord, bar, or other support 32, detachably secured to the handle 2 of the machine by means of a hook 35, the opposite extremity thereof being secured to the frame 28 of the receptacle. Rigidly secured to or made integral with wheel 1 is the belt-pulley 33. From this pulley 33 motion is imparted to the carrier of the device by a belt 34, said belt connecting pulleys 33 and 19. In order that the carrier may run in the proper direction, belt 34 is given a half-turn, as at 36. Side pieces 8 and 9 are preferably extended upward from the rollers a short distance to prevent the grass from falling over the sides of the machine.

From the description given with reference to the accompanying drawings, it will be readily seen that when the machine is put into operation motion is communicated from wheel 1, provided with belt-pulley attachment 33, to pulley 19 by means of belt 34, that one of pieces 22 catches against shoulder 27 of notch 26, and causes spindle 13, with roller 12, to rotate therewith, which in turn imparts motion to bands 14, with cross-strips 15. Then the grass flying backward from the knives of the machine and falling on said carrier is conveyed thereover to the receptacle 6. It will also be observed that by the use of a ratchet-pulley 19 any backward movement of the machine imparted to wheel 1, as in turning, backing, &c., is not transmitted to the carrier, thereby obviating all danger of clogging and of scattering the material over the field.

When receptacle 6 becomes filled with the cut grass, it is detached from the machine and emptied.

Having thus described my invention, what I claim is—

The combination, with a lawn-mower, of the elevator side pieces and connecting-board, the rollers journaled in said side pieces and the apron carried upon said rollers, the pulley having radial recesses provided with spring-actuated pawls, the projecting journal having a shouldered recess on one side, the band connecting the pulley with a driving-pulley on the mower-shaft, and a receptacle for the grass, all arranged and combined as set forth.

In testimony whereof I affix my signature in presence of two witnesses.

THERON FREMONT BARTLETT.

Witnesses:
WM. MCCONNELL,
G. J. ROLLAUDET.